(12) United States Patent
Appleby et al.

(10) Patent No.: US 8,219,666 B2
(45) Date of Patent: Jul. 10, 2012

(54) GENERATING AN UPDATE STATUS ALERT IN A DEVICE

(75) Inventors: Richard Mark Appleby, Hampshire (GB); Bharat Veer Bedi, Hampshire (GB); Martin Gale, Hampshire (GB); Lucas William Partridge, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 11/915,597

(22) PCT Filed: May 12, 2006

(86) PCT No.: PCT/EP2006/062269
§ 371 (c)(1),
(2), (4) Date: Nov. 27, 2007

(87) PCT Pub. No.: WO2006/128785
PCT Pub. Date: Dec. 7, 2006

(65) Prior Publication Data
US 2008/0215665 A1    Sep. 4, 2008

(30) Foreign Application Priority Data

May 28, 2005  (GB) .................................. 0511033.3

(51) Int. Cl.
*G06F 15/16* (2006.01)
(52) U.S. Cl. .......................... 709/224; 709/204; 709/240

(58) Field of Classification Search .................. 709/224, 709/240, 204; 725/50, 80
See application file for complete search history.

(56) References Cited

U.S. PATENT DOCUMENTS

| | | | | |
|---|---|---|---|---|
| 6,847,892 B2* | 1/2005 | Zhou et al. | | 701/213 |
| 2002/0095495 A1* | 7/2002 | Otsuka et al. | | 709/224 |
| 2003/0233660 A1* | 12/2003 | Slemmer et al. | | 725/80 |
| 2006/0123080 A1* | 6/2006 | Baudino et al. | | 709/204 |
| 2009/0006571 A1* | 1/2009 | Muto | | 709/206 |

FOREIGN PATENT DOCUMENTS

| | | |
|---|---|---|
| GB | 2397471 A | 7/2004 |
| JP | 1-109952 A | 4/1989 |
| JP | 08-307544 A | 11/1996 |
| JP | 2001-268094 A | 9/2001 |
| JP | 2004-032394 A | 1/2004 |
| JP | 2005-001425 A | 1/2005 |
| WO | 03098908 A1 | 11/2003 |

* cited by examiner

*Primary Examiner* — Djenane Bayard (57) ABSTRACT

A method for generating an update status alert at a receiving device, the receiving device operating in a network of participating devices, each participating device broadcasting status information about a monitored entity associated with a respective participating device, the method comprising the steps of: receiving broadcast status information from each of the participating devices; aggregating the received status information to derive a consensus of the status information received from each of the participating devices; comparing the derived consensus with the status of the monitored entity of the receiving device; detecting a difference between the derived consensus and the status of the monitored entity; and in dependence of a difference being determined, generating an update status alert at the receiving device.

20 Claims, 5 Drawing Sheets

GENERATING AN UPDATE STATUS ALERT IN A DEVICE

FIELD OF THE INVENTION

The invention relates to the field of network computing. In particular, the invention relates to a method and a system for generating an update status alert in a device.

BACKGROUND OF THE INVENTION

Computing has transformed the way in which many companies run their business. This transformation comprises computer systems running and managing manufacturing systems or automating business processes. Automation of these systems has brought with it great benefits, for example, efficiency, speed and reduced costs. There are however some systems which to date have not been automated, for example, determining when to switch off a mobile phone in response to certain environmental variables or turning off a car's fog lights on leaving an area of fog. In each of these systems it has not been possible to automate these systems because of the complexity involved in doing so. Yet, the need to do so is a pressing one, for example, how annoying is it to drive behind someone who has left their car's fog lights on? Or when sitting in a cinema when a person's mobile phone rings because they forgot to turn their mobile phone off or, at the very least turn the ringer application on to silent? It thus becomes obvious to the reader how many more manual entities this same situation is applicable to, for example, when having to configuring the configuration settings in a cluster of servers manually etc.

Thus there is a need for a method and system to alleviate the above problem.

DISCLOSURE OF THE INVENTION

Viewed from a first aspect the present invention provides a method for generating an update status alert at a receiving device, the receiving device operating in a network of participating devices, each participating device broadcasting status information about a monitored entity associated with the respective participating device, the method comprising the steps of: receiving broadcast status information from each of the participating devices; aggregating the received status information to derive a consensus of the status information received from each of the participating devices; comparing the derived consensus with the status of the monitored entity of the receiving device; detecting a difference between the derived consensus and the status of the monitored entity; and in dependence of a difference being determined, generating an update status alert at the receiving device.

The present invention advantageously provides for devices operating in a collaborative environment to broadcast data concerning the current status of an application, a system or another type of device that they are monitoring, to other devices near them. Devices are able to receive data broadcast from each of the devices and aggregate the received data to derive a consensus view of what the status of a particular monitored entity should be. For example, if the monitored entity is a ringer application on a mobile phone, the consensus view maybe that the ringer application should be switched off. A comparison is performed between the current status of the monitored entity of the receiving device with the generated consensus view. If the statuses differ an alert is generated to inform the receiving device to update its settings.

Advantageously, the generation of the alert allows an operator of the monitored entity to update its settings manually. The alert may take the form of a vibration alert in a mobile phone followed by a visual alert on the mobile phone's screen or if the invention is operating in a vehicle an alert on the dashboard etc.

Preferably, the present invention provides a method wherein each of the received broadcast status information forms a profile comprising data identifying the participating device, the monitored entity and the monitored entity attributes.

Preferably, the present invention provides a method wherein the aggregation step further comprises deriving an idealised profile from the aggregation of the received broadcast status information from each of the plurality of participating devices.

Preferably, the present invention provides a method further comprising a conversion step mapping the data format of the entity's attributes of the received profile to the same data format of the entity's attributes of the receiving device.

Preferably, the present invention provides a method wherein the aggregation step further comprises deriving a set of statistical data from the aggregation of the received status information.

Preferably, the present invention provides a method wherein a weightings rule set is applied to the derived statistical data to determine whether the derived statistical data provides a positive indication that a particular recommended action should be performed.

Preferably, the present invention provides a method wherein the aggregation step further comprises parsing each received profile to determine which entity types each of the received profiles have in common with the monitored entity types of the receiving device in order to from a plurality of working sets of profiles.

Preferably, the present invention provides a method wherein the monitored entity is an entity in which an manual operation is required in order to update the entity's operational parameters in response to the alert being generated.

Preferably, the present invention provides a method wherein the device is a vehicle.

Preferably, the present invention provides a method wherein the device is a mobile phone.

Viewed from a second aspect the present invention provides a system for generating an update status alert at a receiving device, the receiving device operating in a network of participating devices, each participating device broadcasting status information about a monitored entity associated with the respective participating device, the system comprising: a receiving component for receiving broadcast status information from each of the participating devices; an aggregation component for aggregating the received status information to derive a consensus of the status information received from each of the participating devices; a comparing component for comparing the derived consensus with the status of the monitored entity of the receiving device; a detecting component for detecting a difference between the derived consensus and the status of the monitored entity; and in dependence of a difference being determined, a generation component for generating an update status alert at the receiving device.

Preferably, the present invention provides a system wherein each of the received broadcast status information comprises means for forming a profile comprising data identifying the participating device, the monitored entity and the monitored entity attributes.

Preferably, the present invention provides a system wherein the aggregation component further comprises means for deriving an idealised profile from the aggregation of the received broadcast status information from each of the plurality of participating devices.

Preferably, the present invention provides a system further comprising a conversion component for converting the data format of the entity's attributes of the received profile to the same data format of the entity's attributes of the receiving device.

Preferably, the present invention provides a system wherein the aggregation component further comprises means for deriving a set of statistical data from the aggregation of the received status information.

Preferably, the present invention provides a system wherein a weightings rule set is applied to the derived statistical data to determine whether the derived statistical data provides a positive indication that a particular recommended action should be performed.

Preferably, the present invention provides a system wherein the aggregation step further comprises parsing each received profile to determine which entity types each of the received profiles have in common with the monitored entity types of the receiving device in order to from a plurality of working sets of profiles.

Viewed from a third aspect the present invention provides a computer program product loadable into the internal memory of a digital computer, comprising software code portions for performing, when said product is run on a computer, to carry out the invention as described above.

Viewed from a fourth aspect the present invention provides a vehicle adapted for receiving an onboard processing device for performing the invention as described above.

Viewed from a fifth aspect the present invention provides a mobile phone adapted for receiving an onboard processing device for carrying out the invention as described above.

BRIEF DESCRIPTION OF THE DRAWINGS

Embodiments of the invention are described below in detail, by way of example only, with reference to the accompanying drawings in which.

DETAILED DESCRIPTION OF THE INVENTION

Figure 1:
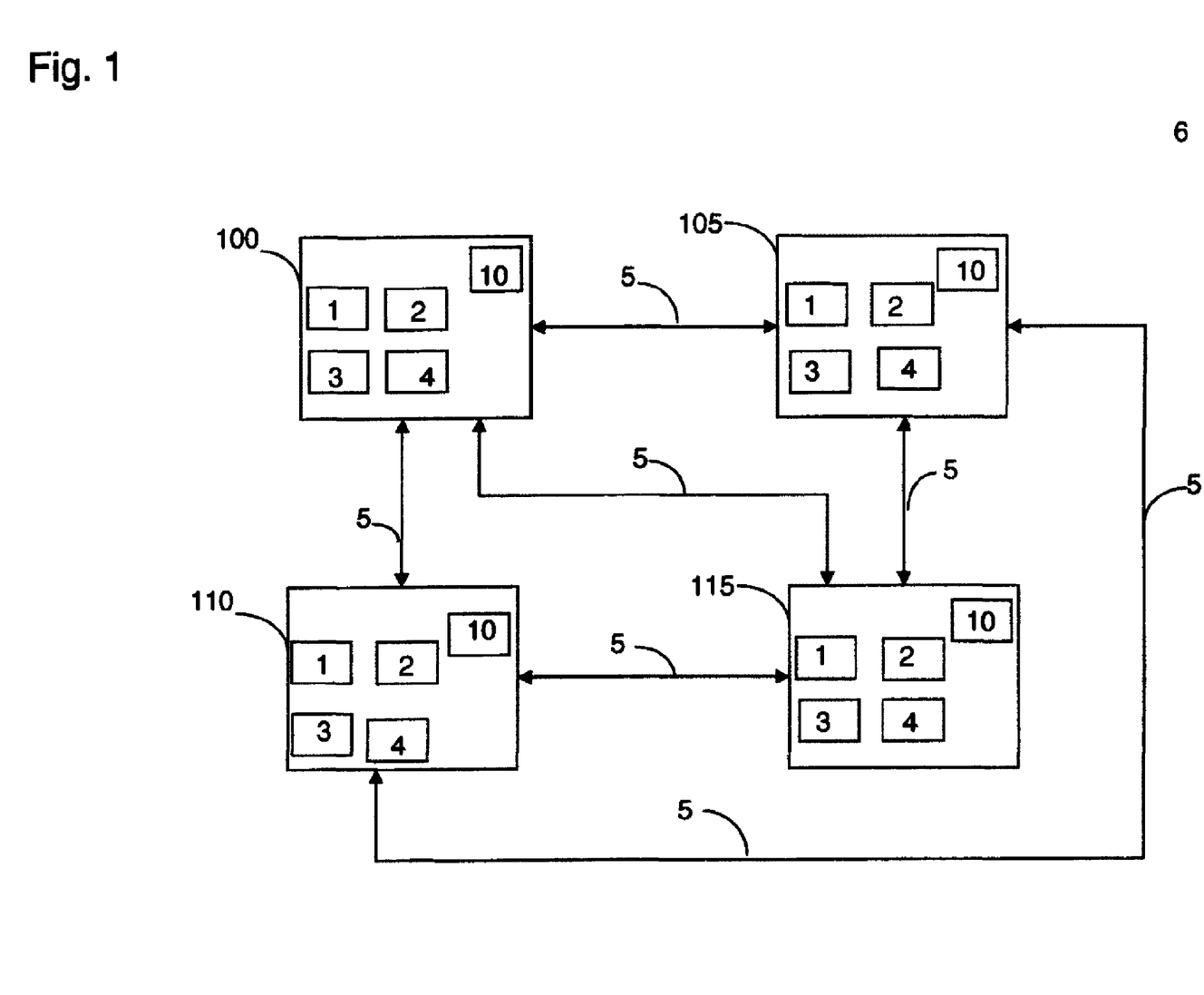
FIG. 1 illustrates a typical computing environment in which the present invention may be embodied.

FIG. 1 shows a number of known computing devices 100, 105, 110, 115. Each device comprises a processor 1, random access memory 2, a storage device 3 and a communications interface 4. Each computing device 100, 105, 110, 115 operates within a peer to peer network 6 and is capable of sending and receiving information to and from other computing devices 100, 105, 110, 115. The peer to peer network 6 may comprise any suitable communication medium 5 applicable to the environment in which the invention is to be implemented. For example in a wireless environment the communication medium may form a Bluetooth wireless network. Alternatively, in a more static environment the network may comprise an Ethernet type implementation.

In one embodiment the peer to peer network 6 is more transient in nature with many devices 100, 105, 110, 115 joining and leaving the network in any given time period, for example, vehicles moving in and out of an area of fog. In another embodiment the peer to peer network may be of a more static form, for example, a number of mobile phones in a cinema. In this example, the number of mobile phones within the network is likely to remain static until the film viewing has finished and the computing devices leave the cinema.

Each of the computing devices 100, 105, 110, 115 may take the form of a standalone computing device, such as, mobile phone, PDA, MP3 player or laptop computer etc, an embedded device within a larger system or other industrial control type applications etc. For example, a computing device may be embedded in a car or a server type system. The type of computing device is dependent on the type of environment in which the invention is to be implemented.

Each computing device 100, 105, 110, 115 comprises a number of known prior art components, for example, a processor 1, some form of permanent storage medium 2, random access memory 3 and a communications component 4 for sending and receiving data from other computing devices 100, 105, 110, 115.

In addition to the above prior art components each computing device 100, 105, 110, 115 comprises a monitoring component 10 for carrying out the invention.

Each computing device 100, 105, 110, 115 comprises a monitoring component 10 for monitoring an entity. An entity may be a system, such as, the front or rear fog lights of a vehicle or an application, such as, the ringer application of a mobile phone. The monitoring component 10 may monitor an entity installed on the device 100, 105, 110, 115, such as, a ring tone application or the monitoring component 10 may monitor an entity which is external to the device 100, 105, 110, 115. For example, the monitoring component 10 may be installed in an embedded device in a car and the entity being monitored being the front and/or rear fog lights of the car.

The monitoring component 10 may also monitor more than one entity. For example, a monitoring component 10 may monitor the front and/or rear fog lights of a car and the speed at which the vehicle is travelling through the fog. Thus a notification may be generated by the monitoring component to recommend to the operator of a vehicle to turn their fog lights on when driving through fog and also to slow the speed of the vehicle down because compared to the speed of other vehicles the vehicle is travelling too fast.

The monitoring component 10 may be in the form of a plug-in component for extending and modifying the computing capabilities of a known computing device. For example, the monitoring component 10 may be developed as a downloadable add-on component for a mobile phone or as a specialised tailored application for installing in a vehicle at the time of the manufacture of the vehicle. The monitoring component 10 may be developed using any programming language which is suitable for the environment in which the monitoring component 10 is to operate.

The monitoring component 10 functions by monitoring an entity to determine the entity's current status. Thus when an operator changes an entity's settings the monitoring component 10 detects the change in the entity's current status.

On detecting a change to the entity's current status the monitoring component 10 writes the entity's current status to a profile for broadcasting to other monitoring components 10 operating on other devices. The monitoring component 10 also receives profiles broadcasted from other monitoring components 10 installed on other computing devices 100, 105, 110, 115. The monitoring component 10 on receipt of a number of broadcasted profiles proceeds to perform statistical analysis to derive an idealised profile based on the consensus view of each of the received broadcasted profiles. Once an idealised profile is generated an alert is generated to recommend to the operator of the device to update the entity's status to reflect the recommended status within the idealised profile. It will also be apparent to the person skilled in the art that the notification could trigger a further add-on application which automatically updated the entity's current settings without any intervention from the operator.

Figure 2:
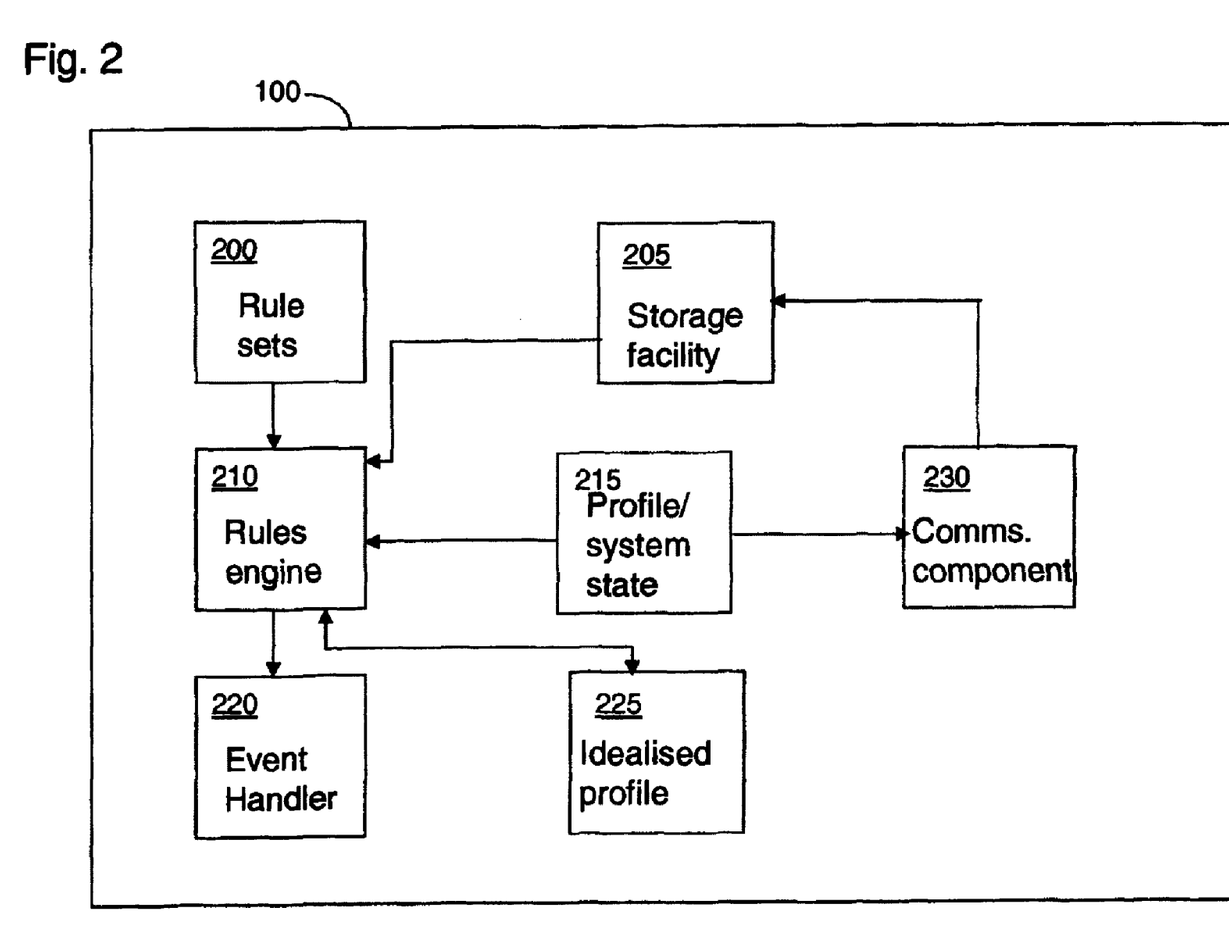
FIG. 2 shows a component diagram detailing the individual functional components of the invention.

Moving on to FIG. 2, the monitoring component 10 and its sub components will be explained in greater detail. The monitoring component 10 comprises a number of subcomponents which interact with each other to perform the monitoring function. The sub components comprise a number of rules 200, a rules engine 210, an event handler 220, a storage facility 205, a system state profile 215, idealised profile 225 and a communication component 230. Each of these subcomponents will now be explained in turn.

Each device 100, 105, 110, 115 comprises a profile 215. The profile 215 stores information about each entity the device 100, 105, 110, 115 is monitoring. For example, if the entity being monitored is a ring application of a mobile phone, then data would be stored detailing the volume setting, for example high or low, a percentage value, for example fifty percent or as an integer value i.e. 1, 2, 3, 4 or 5. The integer value 1 being the quietest and the integer value 5 being the loudest.

The profile 215 is updated periodically by the rules engine 210 on detecting a change to the status of the monitored entity. An interface may be provided which interfaces with the monitored entity to detect updates in the status of the monitored entity. The interface on detecting an update sends a message to the rules engine 210 which in turn updates the profile/system state of the monitored entity. The detected update overwrites any previously stored status pertaining to the monitored entity in the profile. Once an update has been written to the profile 215, the communication component 230 broadcasts the data within the profile 215 out into the peer to peer network for receiving by other computing devices 100, 105, 110, 115.

The data may be stored within the profile 215 using any suitable data format. The data maybe stored in an XML format which provides a universal naming convention for describing data or any other self describing format. An example of a simple profile 215 is shown in example 1.

Example 1

```
DEVICE_ID <unique 128bit identifier> {
    Entity {
        Entity_ID        <128bit index>
        TYPE             RINGER
        STATUS           ON
        RINGER_VOLUME    10
    }
    Entity {
        Entity_ID        <128bit index>
        TYPE             VIBRATE
        STATUS           OFF
```

-continued

```
        INTENSITY        10
    }
}
```

Example 1 shows an example of a simple profile 215 for a computing device 100, 105, 110, 115. The profile 215 begins by identifying the computing device 100, 105, 110, 115 where the monitoring component 10 is installed by the usage of a device identifier (ID). The device ID comprises an identifier which uniquely identifies the device 100, 105, 110, 115 from other devices 100, 105, 110, 115 within the peer to peer network 6. Next the profile 215 details each of the entities which are being monitored by the device 100, 105, 110, 115. Again each entity is assigned a unique identifier which identifies it from other entities listed within that specific profile 215. Listed underneath each entity are the attributes associated with each of the entities, for example, type, status and intensity. The type 'attribute' identifies to the monitoring component 10 the type of entity that is being monitored. For example, in example 1, the monitored entities are a ringer application and a vibrate application. Other types of attributes may be listed depending on the type of entity being monitored. Each attribute may be characterised by a Boolean value or integer value etc.

Different manufactures may represent a given type of entity's attributes differently to other manufactures. For example a Nokia® mobile phone may define a ring application attributes in terms of integer values i.e. integer value 1, 2, 3, 4 and 5; integer value 1 pertaining to a low ring volume and integer value 5 representing a loud ring volume. Whereas a Sony Ericsson® mobile phone may represent a ring application's attributes as low, medium or high. Thus a conversion mechanism (not shown), which forms part of the rules within the rules engine 210, is provided to convert between one manufacture's defined attributes to another.

The communication component 230 also receives profiles 215 broadcast from other devices. On receipt of a profile the communication component 230 sends a message to the rules engine 210 to trigger a validation process to determine whether the received profile is of any interest to the rules engine 210.

Figure 3:
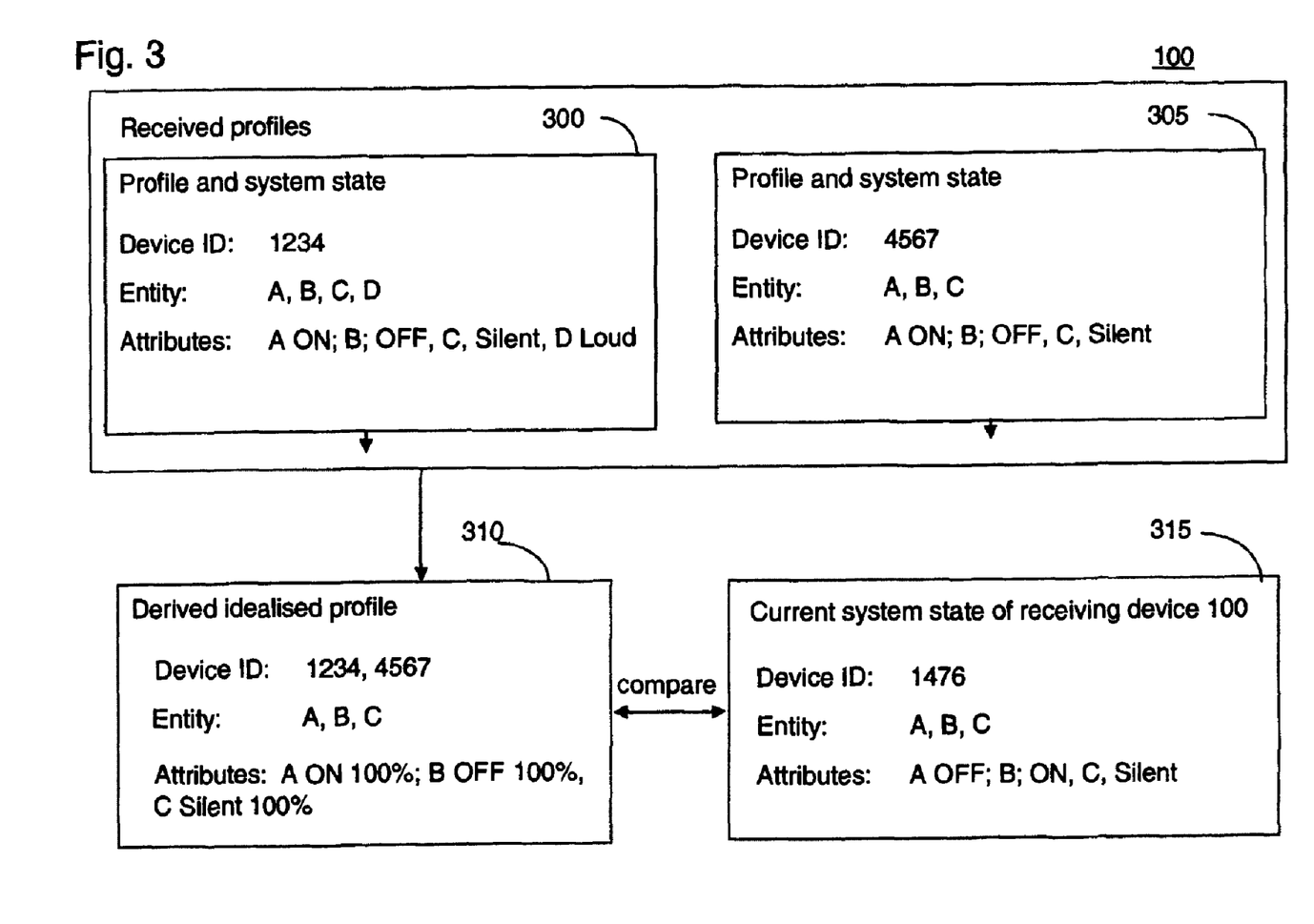
FIG. 3 illustrates two system state profiles received by a receiving device, the receiving device's own system state profile and derived idealised profile.

Each device 100, 105, 110, 115 stores a generated idealised profile 310. The idealised profile 310 stores statistical information, which is generated by the rules engine 210, for each monitored entity of the receiving device 100. Once the idealised profile 310 is generated by the rules engine 210, the rules engine 210 informs the event handler 220 whether there is any recommended action that should be generated. For example, an operator should update a monitored entity's status from 'on' to 'off'.

The profiles 215 and the generated idealised profile 225 are stored in a storage facility 205. Any type of storage facility 205 may be embodied that is suitable for data storage and/or retrieval.

Moving onto the rules engine 210, the rules engine 210 comprises a number of rule sets 200 for performing the following operations:

Conversion rule set
Validation rule set
Statistical analysis rule set
Weighting operations rule set
Determination of appropriate actions to be generated rule set
Data management rule set The rule sets 200 are stored in the storage facility 205 and can be updated and modified by accessing the storage facility 205. Depending on the trigger the rules engine 210 receives from the communication component 230 or from one or more of the above rule sets, the rules engine 210 parses each of the above listed rule sets to determine how to process the data within each of the received profiles 215. Each of the rule sets performs a unique function. For example, the conversion rule set provides for the analysis of the monitored entity attributes where the entity attributes are manufacture or application specific.

The validation rule set determines whether a received profile 215 is a) readable and b) whether the profile 215 comprises information about an entity for which the receiving device 100, 105, 110, 115 is interested in. For example in order to derive an idealised profile about a particular entity type, the validation rule set must first determine whether the received profile does comprise information about the particular entity type. Continuing with an example, if device A is monitoring entity A and device B is monitoring entity A and entity B, then from device A's point of view it is only interested in analysing the attributes associated with entity A and not entity B because device A is not monitoring device B. Another example may be that device A is monitoring entities A and B. Device A receives a profile comprising data pertaining to monitored entities A, B, C and D. Thus the monitoring component of device A determines whether the received profile comprises data pertaining to entities that it is interested in, namely entities A and B. In this instance the received profile does comprise data pertaining to entities A and B and thus the received profile is stored by the monitoring component. If, for example, a profile is received comprising data pertaining to entities C and D and the receiving device is monitoring entities A and B, then in this instance the monitoring component would disregard the received profile as the profile does not comprise any data relating to entities A and B and is therefore of no interest to the receiving device.

A conversion rule set takes each of the received profiles and identifies each of the data types used to describe an entity and its attributes. For example a Nokia mobile phone may describes its ringer application attributes in terms of integer values 1 to 5, whereas a Motorola mobile phone may describe its ringer application in terms of high, medium and low, for example. Thus the conversion rule sets identifies each of these attributes and maps this to the attributes used by the receiving device to allow for easier computation of entities attributes. For example, if the receiving device is a Sony Ericsson mobile phone and the ringer application's attributes of the Sony Ericsson is described by way of percentage values, the conversion rule set will map the attributes of the Nokia mobile phone and the Motorola mobile phone to percentage values.

Once each of the received profiles 215 has passed the validation process, each of the profiles are stored in the storage facility 205 for processing by the statistical analysis rule set. Before the statistical analysis rule set performs its operation, the validation rule set determines a number of working sets of profiles for processing. A working set of profiles is a set of profiles comprising a number of common monitored entities and their respective attributes. For example, if a receiving device is monitoring entity A and entity C and the following validated profiles are stored in the storage facility:

Example 2

Device ID 1, entity A, entity B
Device ID 2, entity A, entity C
Device ID 3, entity A, entity C From the receiving device's view point, only certain entities are of interest to the receiving device and used in forming working sets of profiles for entity A and entity B.

To explain further, the receiving device, as explained above is monitoring entity A and entity C. Therefore, looking at each of the device ID'S profiles above, device ID'S 1, 2 and 3 each have entity A in common with the receiving device and device ID's 2 and 3 each have entity c in common with the receiving device. Thus the validation rule set, in this example, determines there are two working profile sets for analysis i.e. working profile set A comprising the respective attributes of entity A for device ID's 1, 2 and 3 and working profile set B comprising the respective attributes of entity C for device ID'S 2 and 3.

On determination of the one or more working sets of profiles, the statistical analysis rule set begins by determining whether there are enough profiles within each identified working set of profiles to be able to perform the statistical analysis. The number of profiles required may vary depending on the implementation of the invention. For example, in a mobile phone environment where accuracy of the result is not of the upmost importance, the number of profiles could be for example, as little as 10 profiles. But in an environment where the accuracy of the result is of the upmost importance, the number of profiles may be much higher for example.

Once the storage facility 205 comprises enough profiles 215 within a working profile set to proceed, the statistical analysis rule set begins to analyse the attributes of each of the entities to determine the various operational status. For example how many entity A's have an attribute of A and how many entity A's have an attribute of B. To put this into a more meaningful context by using an example of a number of profiles pertaining to mobile phone devices each having an entity of a ring application with a number of different attributes. For example:

Example 3

Mobile phone device ID: 1, entity ID A, Type ring application, status on, intensity low
Mobile phone device ID: 2, entity ID B, Type ring application, status on, intensity low
Mobile phone device ID: 3, entity ID C, Type ring application, status off, intensity loud The statistical analysis rule set begins by parsing each of the profiles within the defined working set of profiles to identify the status of each of the entity's attributes.

For example parsing each of the profiles 215 in example 3 entity ID A has an attribute of ring application and a status of low. Entity ID B has an attribute of ring application with a status of low and entity ID C has an attribute of ring application with an intensity of loud. Thus the statistical analysis rule set can determine that within this working profile set two entity ID'S have a status of low and one entity ID has a status of loud. Taking this information the statistical analysis rule set can begin to perform other statistical analysis operations to determine, for example, the average status of the totality of the profiles in each working profile set and the modal value.

Once the statistical analysis is complete the statistical analysis rule set triggers the weightings rule set in order to determine whether the percentage values derived from the statistical data give enough of a majority value to generate a recommended action. For example, if for any given working set of profiles the following statistics are derived:

Example 4

Entity A on 65%, off 35%
Entity B on 51%, off 49%.

The weighting rule set parses each of the statistical records and analyses each of the percentages in relation to each other to determine if the percentage weightings give enough of a majority value to recommend an action within the monitored entity. For example taking the derived statistics for entity A; 65% of profiles pertaining to entity A have a status of on and 35% of profiles pertaining to entity A have a status of off. In this instance the rules may decide that 65% is a clear majority and recommend that all entity A's should have a recommended status of on. Conversely, moving onto the derived statistics for entity B, 51% of entity B profiles have a status of on and 49% of entity B profiles have a status of off. In this instance the rules may decide that 51% is not a clear majority and thus no recommended action is necessary. It will also be obvious to a person skilled in the art that although the above example is very simplistic, more complicated rules may be developed to analyse more complex situations.

A storage management rule set manages the profiles 215 stored in the storage facility 205. For example, if on receiving a new profile 215 from a device 100, 105, 110, 115, there is no capacity within the storage facility 205 to store the new profile 215, a rule may require deletion of all profiles 215 that have been stored within the storage facility for more than ten days.

The last rule set determines how the monitored entity should be notified of a recommended action. In order to do this the rule set takes into account the type of device and the entity that is being monitored. Thus, if the device 100, 105, 110, 115 is a mobile phone for example, a vibration action maybe a suitable alert to alert the operator that they should look at their device to read a notification on their screen. If the device is an embedded device within a car, then a notification alert on the vehicle's dashboard maybe suitable. Once the type of notification is decided a message is sent to the event handler 220 for generating the event to the device 100, 105, 110, 115.

FIG. 3 illustrates two received profiles 300, 305, a current system state profile 315 for the receiving device 100 and a generated idealised profile 310. Each profile 300, 305 details the device ID of the device that broadcast its profile, along with each of the monitored entities identifier and its attributes.

As explained above the rules engine 210 calls into action a number of rule sets to process each of the received profiles 300, 305. Firstly the validation rule sets determines whether the received profiles 300, 305 are valid profiles, for example, are each of the received profiles 300, 305 readable?

Once validated the validation rule sets determines if the received profiles are profiles of interest to the receiving device 100. For example with reference to the receiving device's 100 system state profile 315, the receiving device 100 is monitoring entities A, B and C. Thus the only profiles of interest to the receiving device 100 are profiles listing data about entities A or B or C. Therefore in this example, the receiving device 100 accepts the profiles 300 and 315—this is even though profile 300 comprises data about an entity D. Although entity D is of no interest to the receiving device it is part of the received profile 300 and is thus stored. Alternatively, an optimisation process may be deployed by the conversion rule set which on detecting that entity D is of no interest to the receiving device it deletes the entry for entity D before storing the received profile.

Next the rule set parses each entity's attributes to derive a value representative of the overall status of the entity, for example, a percentage value. For example profile 300 details entity A having an attribute of on and profile 305 details entity A having an attribute of on. Thus the percentage value for both entities having an attribute of on is 100%. The same percentage value can be calculated for entity B and entity C. The weighting rule set may also derive weightings at this point within the process in order to analyse the percentages further and to determine whether it is sensible to generate a recommendation based on the derived percentages.

Once these percentages have been calculated they are written to the idealised profile 310. A comparison is then performed between the idealised profile 310 and the current system state profile 315 of the receiving device 100 to determine a difference between the two profiles 315 and 310. If a difference is detected and the applied weightings suggest a particular recommendation, the weighting rule set further analyses the detected difference and the recommended action to determine if it would be appropriate in this particular instance to send a trigger to the event handler 220 to generate a notification detailing the recommended action. For example, turn the volume of the mobile phone to low or the fog lights of the car off etc.

Figure 4:
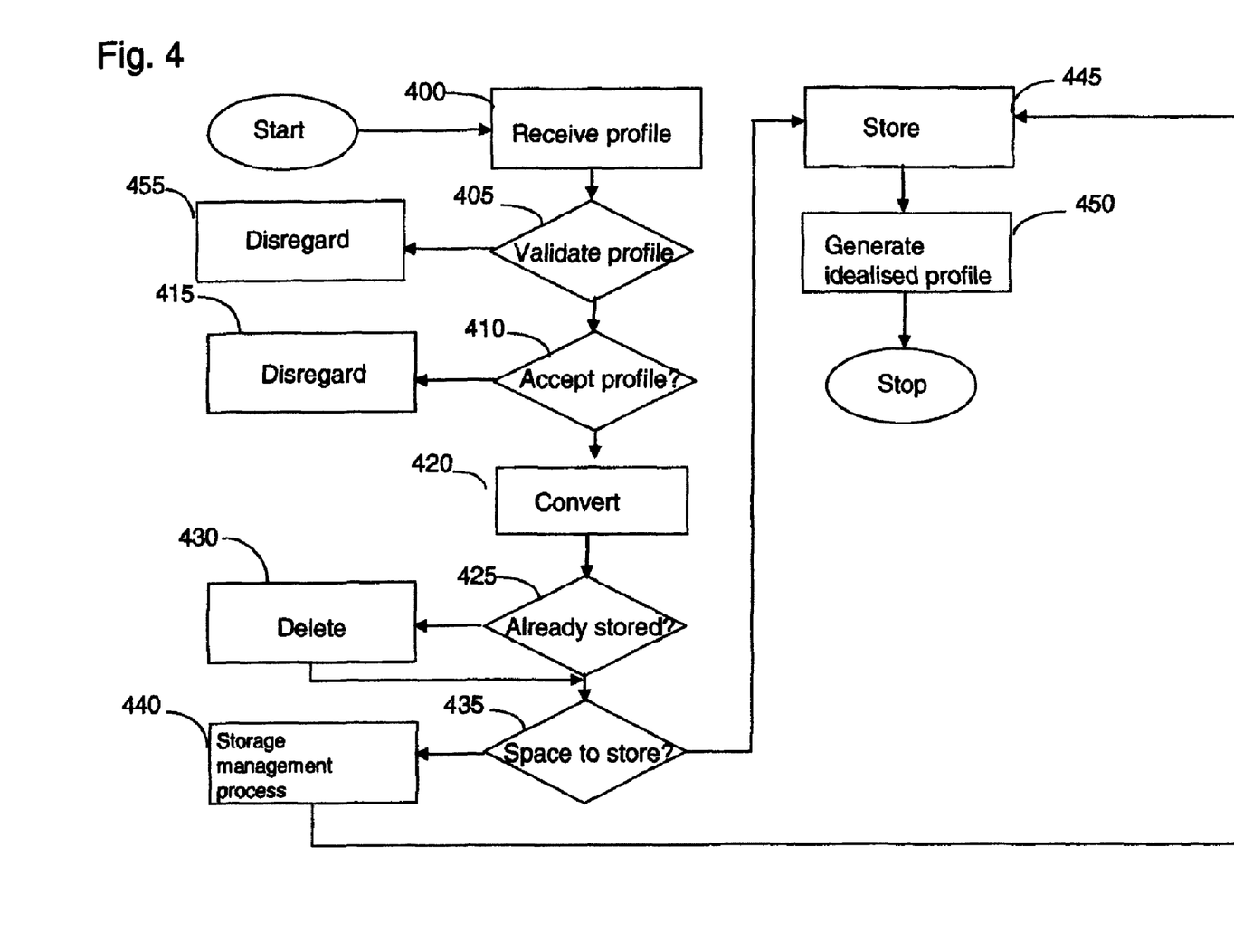
FIG. 4 depicts a flow chart detailing the steps the receiving device performs when receiving a number of profiles from a number of broadcasting devices.

Moving on to FIG. 4 and FIG. 5, the invention will now be explained in use. Firstly with reference to FIG. 4, at step 400 a receiving device 100 receives a profile 215 which has been broadcast from another device 105, 110, 115 via the communications component 230.

At step 405, the validation rule set 200 determines whether the profile 215 is a valid profile and one that is not corrupted such that the profile can not be read. If the profile 215 is corrupted the validation rule set ignores the profile 215 and waits for the next profile 215 to be processed at step 455. If the profile 215 is a valid profile control moves to step 410 and a further determination is performed to determine whether the profile 215 is a profile 215 that the receiving device 100 is interested in. For example, does the profile 215 comprise entries relating to the same type of monitored entities? For example, if device A is monitoring entity of type A does the received profile comprise an entry for entity of type A?

If the determination is negative control moves to step 415 and the profile 215 is disregarded. For example, if the receiving device is monitoring entity of type A and the received profile only comprises entries for entity of type B the profile is disregarded.

If the determination is positive control moves to step 420 and the conversion rule set analyses the received profile to map the entities attributes into a data format which is consistent with the data format of the entity's attributes of the receiving device. For example, if the receiving device is a mobile phone and its entity's attributes are described by a percentage value and the entity's attributes of the received profile are described by way of integer values 1 to 5, the conversion rule set will map the integer values 1 to 5 to a percentage value.

Once the entity attributes have been converted into a suitable data format the validation rule set proceeds to determine if the received profile 215 has previously been stored in the storage facility 205 at step 425. If the determination is positive control moves to step 430 and the previously received profile for the device 105 which sent the received profile is deleted and control moves to step 435. At step 435 a further determination is made as to whether there is enough space within the storage facility 205 to store the received profile. If the determination is positive control moves to step 445 and the received profile is stored in the storage facility 205 for generating an idealised profile at step 450. Moving back to step 435 if it is determined that there is not available space in which to store the received profile, a storage management rule set is triggered at step 440. For example, the rule set may state that if a profile has been stored for greater that 30 days then the profile can be deleted. If there is space available within the storage facility/or space is made available within the storage facility (step 445) the received profile 215 is stored at step 445 and at step 450 the statistical analysis rule set is triggered to begin to generate an idealised profile.

Figure 5:
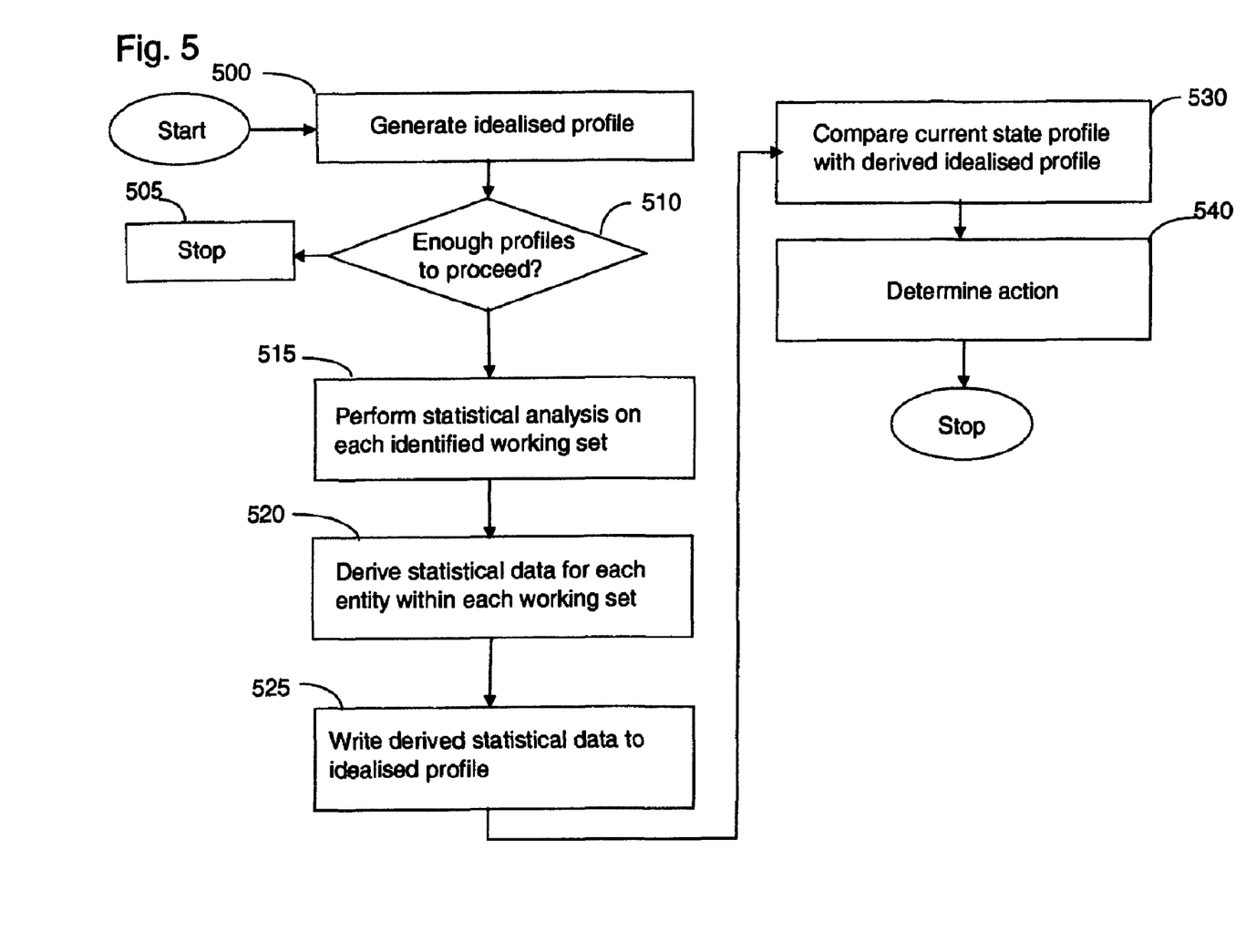
FIG. 5 depicts a flow chart which details the steps the receiving device performs in order to derive an idealised profile.

Working through FIG. 5, at step 500, the statistical analysis rule set begins to generate an idealised profile 225. Firstly, at step 510, the statistical analysis rule set determines whether there are enough profiles stored in each working profile set to proceed with the analysis. If the determination is a negative determination, control moves to step 505 and the statistical analysis rule set waits for further profiles to be received.

Once a determination has been made at step 510 that there are enough profiles stored, control moves to step 515 and statistical analysis is performed to determine the overall statistical values for each type of entity's attributes. Further statistical analysis is performed to calculate the mean, mode, median and the standard deviation for each entity's attributes at step 520, for example. On completion of the analysis control moves to step 525 and the derived statistical analysis is written to the receiving device's 100 idealised profile 225. At step 530 a comparison is performed between the current status of each of the entities being monitored by the receiving device 100 with the statistical data stored in the idealised profile 225. The weightings rule set determines in response to the comparison what recommended actions should be performed at step 535, such as what type of notification should be generated by the event handler. The event handler on receipt of a trigger from the weightings rule set proceeds to generate the most appropriate alert to notify the operator to change the operational settings of the device in line with the recommendation listed within the notification.

The invention claimed is:

1. A method for generating an alert for a monitored entity at a receiving device, said receiving device operating in a network of participating devices, at least some of said participating devices comprising a monitored entity of the same device type as the monitored entity in said receiving device, the method being performed in said receiving device and comprising:
   receiving status information about said same device type from said receiving device and from each of said participating devices comprising a monitored entity of said same device type;
   aggregating the status information received from said participating devices to derive a device type status consensus for said device type;
   comparing the device type status consensus with the status of the monitored entity at said receiving device;
   establishing a difference between the device type status consensus and the status of the monitored entity in said receiving device; and
   generating an alert for the monitored entity at said receiving device as a function of the established difference.

2. A method according to claim 1 wherein at least some of said receiving device and said participating devices include monitored entities of different device types.

3. A method according to claim 2 further comprising forming a profile in said receiving device for each participating device, said participating device profile comprising data identifying the participating device, one or more monitored entities associated with the participating device and the attributes of each of said monitored entities.

4. A method according to claim 3 further comprising aggregating information received in the participating device profiles to create a network-wide profile comprising different device types found in at least one of said receiving device and said participating devices and further comprising the device type consensus for each different device type.

5. A method according to claim 3 wherein forming a profile in said receiving device for a monitored entity in a participating device further comprises mapping the data format of the monitored entity's attributes in the participating device to the data format of the monitored entity's attributes of the receiving device.

6. A method according to claim 3 wherein aggregating the received status information to derive a device type status consensus further comprises deriving a set of statistical data based on the aggregation of the received status information.

7. A computer program product for generating an alert for a monitored entity at a receiving device, said receiving device operating in a network of participating devices, at least some of said participating devices comprising a monitored entity of the same device type as the monitored entity in said receiving device, the computer program product comprising a computer usable storage medium having computer usable program code stored thereon, said computer usable program code being loadable into and executable by a computer, said computer usable program code comprising:
   computer usable program code configured to receive status information about said same device type from said receiving device and from each of said participating devices comprising a monitored entity of said same device type;
   computer usable program code configured to aggregate the status information received from said participating devices to derive a device type status consensus for said device type;
   computer usable program code configured to compare the device type status consensus with the status of the monitored entity at said receiving device;
   computer usable program code configured establish a difference between the device type status consensus and the status of the monitored entity in said receiving device; and
   computer usable program code configured to generate an alert for the monitored entity at said receiving device as a function of the established difference.

8. A computer program product according to claim 7 wherein at least some of said receiving device and said participating devices include monitored entities of different device types.

9. A computer program product according to claim 8 further comprising computer usable program code configured to form a profile in said receiving device for each participating device, said participating device profile comprising data identifying the participating device, one or more monitored entities associated with the participating device and the attributes of each of said monitored entities.

10. A computer program product according to claim 9 further comprising computer usable program code configured to aggregate information received in the participating device profiles to create a network-wide profile comprising different device types found in at least one of said receiving device and said participating devices and further comprising the device type consensus for each different device type.

11. A computer program product according to claim 9 wherein the computer usable program code configured to form a profile in said receiving device for a monitored entity in a participating device further comprises computer usable program code configured to map the data format of the monitored entity's attributes in said participating device to the data format of the monitored entity's attributes in said receiving device.

12. A computer program product according to claim 9 wherein computer usable program code configured to aggregate the received status information to derive a device type status consensus further comprises computer usable program code configured to derive a set of statistical data based on the aggregation of the received status information.

13. A system for generating an alert for a monitored entity at a receiving device, the receiving device operating in a network of participating devices, each participating device broadcasting status information about a monitored entity associated with the respective participating device, each of said monitored entities being of the same type, the system comprising:
- a receiving component for receiving status information about said same device type from said receiving device and from each of said participating devices comprising a monitored entity of said same device type;
- an aggregation component for aggregating the status information received from said participating devices to derive a device type status consensus for said device type;
- a comparing component for comparing the derived device type status consensus with the status of the monitored entity at said receiving device;
- a detecting component for establishing a difference between the derived device type status consensus and the status of the monitored entity at said receiving device; and
- a generation component for generating an alert for the monitored entity at said receiving device as a function of the established difference.

14. A system according to claim 13 wherein at least some of said receiving device and said participating devices include monitored entities of different device types.

15. A system according to claim 14 further comprising a profile generator for forming a profile in said receiving device for each said participating device, said participating device profile comprising data identifying a participating device, one or more monitored entities associated with the identified participating device and the attributes of each of said monitored entities.

16. A system according to claim 15 wherein said profile generator further creates a network-wide profile comprising different device types found in at least one of said receiving device and said participating devices and further comprising the device type status consensus for each different device type.

17. A system according to claim 15 further comprises a mapping component for mapping the data format of a monitored entity's attributes in the participating devices to the data format of the same type of monitored entity in said receiving device.

18. A method for generating an alert for a monitored entity at a receiving device, said receiving device operating in a network of participating devices, at least some of said participating devices comprising a monitored entity of the same device type as the monitored entity in said receiving device and at least some of said receiving device and said participating devices including monitored entities of different device types, the method being performed in said receiving device and comprising:
- receiving status information about said same device type from said receiving device and from each of said participating devices comprising a monitored entity of said same device type;
- forming a profile in said receiving device for each participating device, said participating device profile comprising data identifying the participating device, one or more monitored entities associated with the participating device and the attributes of each of said monitored entities;
- aggregating information received in the participating device profiles to create a network-wide profile comprising different device types found in at least one of said receiving device and said participating devices and further comprising the device type consensus for each different device type, wherein aggregating information received in the participating device profiles to derive a network-wide profile comprising different device types found in a least one of said receiving device and said participating devices further comprises parsing each of said participating device profiles to determine which device types are common to said receiving device and one or more of said participating devices, the profiles having a particular device type in common being included in the same working set of profiles;
- aggregating the status information received from said participating devices to derive a device type status consensus for said device type;
- comparing the device type status consensus with the status of the monitored entity at said receiving device;
- establishing a difference between the device type status consensus and the status of the monitored entity in said receiving device; and
- generating an alert for the monitored entity at said receiving device as a function of the established difference.

19. A computer program product for generating an alert for a monitored entity at a receiving device, said receiving device operating in a network of participating devices, at least some of said participating devices comprising a monitored entity of the same device type as the monitored entity in said receiving device and at least some of said receiving device and said participating devices including monitored entities of different device types, the computer program product comprising a computer usable storage medium having computer usable program code stored thereon, said computer usable program code being loadable into and executable by a computer, said computer usable program code comprising:
- computer usable program code configured to receive status information about said same device type from said receiving device and from each of said participating devices comprising a monitored entity of said same device type;
- computer usable program code configured to form a profile in said receiving device for each participating device, said participating device profile comprising data identifying the participating device, one or more monitored entities associated with the participating device and the attributes of each of said monitored entities;
- computer usable program code configured to aggregate information received in the participating device profiles to create a network-wide profile comprising different device types found in at least one of said receiving device and said participating devices and further comprising the device type consensus for each different device type, wherein the computer usable program code configured to aggregate information received in the participating device profiles to derive a network-wide profile comprising different device types found in a least one of said receiving device and said participating devices further comprises computer usable program code configured to parse each of said participating device profiles to determine which device types are common to said receiving device and one or more of said participating devices, the profiles having a particular device type in common being included in the same working set of profiles;

computer usable program code configured to aggregate the status information received from said participating devices to derive a device type status consensus for said device type;

computer usable program code configured to compare the device type status consensus with the status of the monitored entity at said receiving device;

computer usable program code configured establish a difference between the device type status consensus and the status of the monitored entity in said receiving device; and computer usable program code configured to generate an alert for the monitored entity at said receiving device as a function of the established difference.

20. A system for generating an alert for a monitored entity at a receiving device, the receiving device operating in a network of participating devices, each participating device broadcasting status information about a monitored entity associated with the respective participating device, each of said monitored entities being of the same type and at least some of said receiving device and said participating devices including monitored entities of different device types, the system comprising:

a receiving component for receiving status information about said same device type from said receiving device and from each of said participating devices comprising a monitored entity of said same device type;

a profile generator for forming a profile in said receiving device for each said participating device, said participating device profile comprising data identifying a participating device, one or more monitored entities associated with the identified participating device and the attributes of each of said monitored entities;

a parsing component for parsing said formed profiles to determine which particular types of monitored entities are common to said receiving device and one or more of said participating devices, the profiles having a particular type of monitored entity in common being included in the same working set of profiles;

an aggregation component for aggregating the status information received from said participating devices to derive a device type status consensus for said device type;

a comparing component for comparing the derived device type status consensus with the status of the monitored entity at said receiving device;

a detecting component for establishing a difference between the derived device type status consensus and the status of the monitored entity at said receiving device; and a generation component for generating an alert for the monitored entity at said receiving device as a function of the established difference.

* * * * *